United States Patent [19]

Hieslmair et al.

[11] 3,732,013
[45] May 8, 1973

[54] MULTIPATH LASER MOVING TARGET INDICATOR

[75] Inventors: Hans Hieslmair, Elberon; John N. Fulton, West Long Branch; Charles J. Bickart, Ocean, all of N.J.

[73] Assignee: The United States of America as represented by the Secretary of the Army, Washington, D.C.

[22] Filed: Apr. 2, 1971

[21] Appl. No.: 130,740

[52] U.S. Cl. .....................356/28, 330/4.3, 331/94.5
[51] Int. Cl. ............................G01p 3/36, H01s 3/00
[58] Field of Search..................356/28; 331/94.5 A, 331/94.5 C, 94.5 D; 330/4.3

[56] References Cited

UNITED STATES PATENTS

| | | | |
|---|---|---|---|
| 3,641,458 | 2/1972 | Tourrette | 331/94.5 |
| 3,436,665 | 4/1969 | Rigrod | 330/4.3 |
| 3,551,050 | 12/1970 | Thorlin | 356/4 |
| 3,409,370 | 11/1968 | King et al. | 356/28 |

FOREIGN PATENTS OR APPLICATIONS 1,183,492   3/1970   Great Britain..........................356/28

*Primary Examiner*—Benjamin A. Borchelt
*Assistant Examiner*—S. C. Buczinski
*Attorney*—Harry M. Saragovitz, Edward J. Kelly, Herbert Berl and Daniel D. Sharp

[57] ABSTRACT

A moving target velocity indicator including a multipath laser which operates simultaneously as an oscillator for producing a laser beam which is directed onto both a moving target and a detector and as an amplifier of the Doppler-shifted laser beam reflected from the target. The optical return signal from the target is amplified while passing through the multipath laser system and is directed, after the final pass through the laser medium, onto the detector, This amplified signal can be combined at the detector with the transmitted signal to provide a beat signal at the frequency of the Doppler shift which can be applied to an oscilloscope display calibrated in frequency. Knowing the frequency of operation of the laser, the velocity of the target can then be calculated.

5 Claims, 2 Drawing Figures

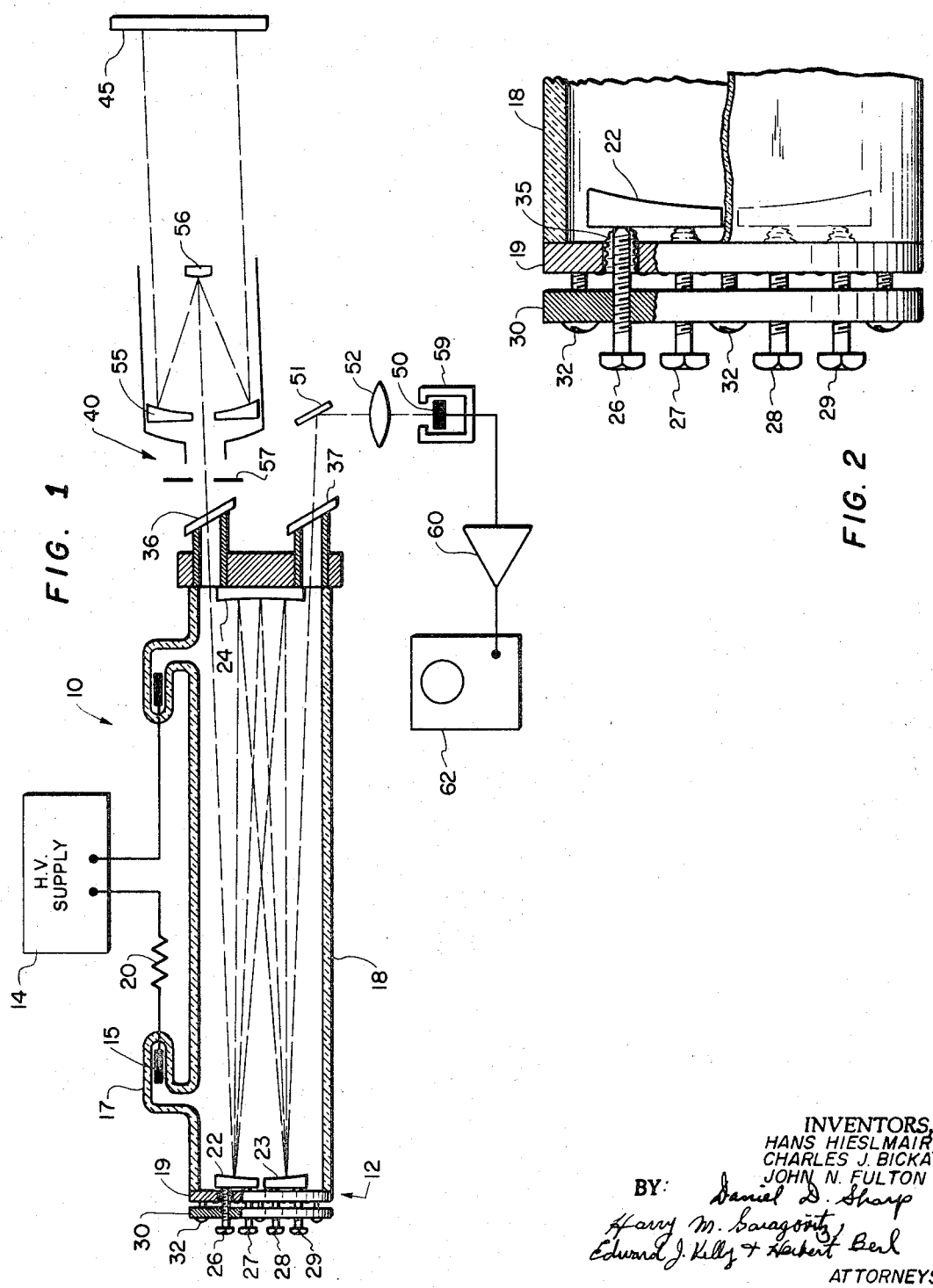

MULTIPATH LASER MOVING TARGET INDICATOR

BACKGROUND OF THE INVENTION

Prior optical systems for obtaining target information have used an optical generator for directing an optical beam at the target and amplifying means, if any, separate from the optical generating means. Such systems require separate equipment packages for the amplification and generation functions. Furthermore, alignment problems become acute with such systems since the transmitted beam and the return beam are traversing different optical paths; this is particularly troublesome in view of the inherently narrow aperture of optical beams. In the past, multipath lasers have been used either solely as an amplifier or solely as an oscillator, with the oscillator having the usual cavity-defining mirrors at each end of the laser medium. Such an arrangement could not be suitable for target information systems since the cavity mirror would attenuate the return signal, which, in most instances, already is quite weak owing to the distance factor and to scattering of the beam upon reflection from the target. Furthermore, the use of a cavity would greatly restrict the oscillator bandwidth. In order to obtain satisfactory operation of target information systems characterized by return signals of very small magnitude, a considerably higher gain is required than can normally be achieved by an ordinary laser amplifier. This gain can be increased considerably by using a multipath laser amplifier; however, prior use of such devices has been restricted to amplifier operation. The present invention, which uses a multipath laser wherein the pump power is increased to just above the threshold for self-oscillation, so that it can operate simultaneously as an oscillator and amplifier, forms part of a novel Doppler moving target indicator system differing from conventional Doppler system in which the return signal from the moving target arrives at the detector directly. The system of the present invention, in addition to requiring a lower laser beam power output for the same detectability, has the advantage over a system using a separate amplifier and oscillator, of a greatly reduced alignment problem since the output laser beam and the return beam signal of inherently narrow beam width travel through a common optical path.

SUMMARY OF THE INVENTION

The system of the invention uses a gas laser, such as a carbon dioxide laser, which includes at one end an initially adjustable reflector or mirror which may be fixed during actual operation and a pair of closely spaced reflectors at the other end which can be adjusted relative to one another and to the fixed reflector at the other end. The laser beam is reflected back and forth between first one of the two adjustable end reflectors and the fixed reflector and then between the other of the two adjustable end reflectors and said fixed reflector, thereby passing back and forth through the gaseous laser medium several times, each time over a somewhat different path. By simple adjustment of one or both of these reflectors, the number of times that the laser beam traverses the gaseous laser medium can be varied and the gain of the laser, which is dependent upon the number of such traversals, is adjustable. A portion of the generated laser beam traversing the initial beam path passes through one of the output windows enroute to a moving target. Another portion of the beam traverses the final beam path and passes through another laser output window to a suitable detector and display. The relatively weak return signal from the target, which is shifted in frequency in accordance with the well-known Doppler effect, returns along the same path over which the laser beam was propagated and is amplified as it negotiates the multiple passes through the laser medium until it is directed along said final beam path onto the detector. This amplified return signal is combined at the detector with the transmitted laser beam to provide a beat signal at the frequency of the Doppler shift which can be applied to a display means such as an oscilloscope calibrated in frequency. The velocity v of the target relative to the observer can then be calculated from the relation $v = \lambda \Delta f_D/2$ where $\lambda$ is the known wavelength of operation of the laser and $\Delta f_D$ is the beat frequency, which can be read from the calibrated display.

BRIEF DESCRIPTION OF THE DRAWING

FIG. 1 is a schematic diagram, partly in section, of a moving target detector system according to the invention; and FIG. 2 is a detailed view, partly in section, showing details of adjustment of the adjustable reflectors at one end of the laser tube of FIG. 1.

DETAILED DESCRIPTION OF THE PREFERRED EMBODIMENT

The moving target indicator system of FIG. 1 includes a multipath gas laser device 10 having an envelope 12 for containing a gaseous lasing medium, such as carbon dioxide, usually combined in smaller amounts of such gases as nitrogen and helium. The laser 10 is pumped by direct current excitation of the gaseous medium using a high voltage direct current supply 14 connected to electrodes 15 mounted in projections 17 which extend off axis of the laser tube envelope 12 so as to avoid obstruction of the laser beam paths through the laser envelope and to trap any material sputtered or otherwise emitted from the electrodes which would cause contamination of portion 18 of the envelope 12 which, for example, may be pyrex glass tubing. A resistor 20 is provided in the pumping circuit and serves as a discharge load for minimizing transient surges during firing of the laser 10. Although not shown in the drawing, more efficient depopulation of the lower laser level of the $CO_2$ molecule can be achieved, and more adequate cooling at higher power levels can be provided, by means of a water jacket surrounding the tube envelope. The multipath optics for the laser 10 includes three reflectors of equal spherical radius of curvature. Two semicircular reflectors 22 and 23 are set close together at one end of the laser and a single reflector 24 is mounted at the other end. The center of curvature of the split reflector made up of reflectors 22 and 23 is on the front surface of reflector 24 and the center of curvature of reflector 24 is disposed halfway between reflectors 22 and 23; with this arrangement, a system of conjugate foci is established on the reflecting surfaces of the reflectors. The reflectors 22 and 23 are each adjustable by means of offset adjusting screws 26 to 29 which threadably engage an end plate 30 fastened to the portion 19 of envelope 12 by screws 32. The metal portion 19 of the envelope is hermetically sealed to the glass portion 12 of the envelope by appropriate glass-to-metal sealing techniques. A hermetic seal for each of the adjustable screws is accomplished by means of the bellows 35. The reflectors 22 and 23 are adapted to rotate about a vertical axis by means of respective screws 27 and 28 and are adjustable about a horizontal axis by means of the corresponding adjustment screws 26 and 29. Although the reflector 24 is shown in the drawing, for the sake of simplicity, as fixed, this reflector 24 can also be made adjustable in both the horizontal and vertical planes by similar adjusting screws. However, the reflector 24 need be adjusted only initially to assist in orienting the laser beam so that it passes through the optically transparent Brewster windows 36 and 37, and once properly set, is left in that position during subsequent laser operation. By adjusting reflectors 22 and 23 relative to one another and to reflector 24, the number of paths or traversals of the amplified laser beam can be varied. The gain of the amplifier thus can be increased by increasing the number of such laser beam passes through the gaseous laser medium. In order for the laser 10 to operate as an oscillator, in addition to operating as an amplifier, the gain must be increased until the laser oscillation threshold is attained. This can be done either by increasing the pumping voltage of the high voltage supply 14 or by adjusting the reflectors 22 and 23 to increase the number of beam passes, or both. A simplified representation of a compound beam path in the laser is shown in FIG. 1. As shown in FIG. 1, the laser beam, after passing through Brewster window 36, passes through transmit-receive optics 40 to the target 45. At the same time, the laser beam is propagated through Brewster window 37 onto a detector 50 by way of the tilted mirror 51 and lens 52. The mirror 51 serves to permit lateral displacement of the detector 50 away from the transmit-receive optics 40 and the laser device, and the lens 52 is used for focusing the return beam upon the detector 50. A portion of the laser beam, upon striking the target 45, is reflected therefrom. Since a certain amount of scattering occurs during this restriction process and also during return through the atmosphere to the laser, it is necessary, in practice, to use the transmit-receive optics 40 to provide a large aperture for collecting the relatively weak return signal and focus it back by a system of reflectors 55 and 56 and thence through the aperture 57 along the path over which the beam originally was launched. After making the several beam passes, shown in FIG. 1 as being eight passes, the return beam or signal passes through the Brewster window 36 and is supplied to the detector 50. The detector 50, which for example, may be mercury-cadmium telluride or gold-doped germanium, is preferably mounted in a dewar 59 for achieving the usual reduction in signal-to-noise ratio accompanying low temperature operation. The beat frequency signal from the detector 50 is amplified by an amplifier 60 and applied to an oscillator display 62 or other suitable display means. As the system operates in the continuous wave mode, the frequency $f_o$ of the laser oscillator energy transmitted to the target 45 will be shifted to $f_o + \Delta f_D$ where $\Delta f_D$ is the Doppler shift resulting from movement of the target relative to the detector. The detector 50 will respond to the frequency $f_o$ of the laser oscillator beam supplied by way of window 37 and to the return signal of frequency $f_o + \Delta f_D$, and the output of the detector will be the beat frequency, viz., $f_o - (f_o + \Delta f_D) = \Delta f_D$, and the oscilloscope display will appear as a sinusoidal wave whose frequency can be picked off directly from the calibrated oscilloscope by simply counting the spacing between successive cycles on the oscilloscope screen. Since the beat frequency $\Delta f_D$ is given by $$\Delta f_D = (2v)/\lambda$$

and since $\lambda$ is the reciprocal of $f_o$, and is known for the given laser, one can calculate the relative target velocity v as the ratio of the Doppler frequency shift $\Delta f_D$ to twice the laser frequency.

While the invention has been described in connection with an illustrative embodiment, obvious modifications thereof are possible without departing from the spirit of the invention. Accordingly, the invention should be limited only by the scope of the appended claims.

What is claimed is:

1. A moving target indicator system comprising a laser oscillator-amplifier device including a lasing medium and pumping means for supplying pump energy to said lasing medium, multi-path optical means comprising reflector means spaced at opposite ends of said lasing medium for directing a generated laser beam through said lasing medium several times along a plurality of paths, said pump energy and said multi-path optical means contributing to provide a laser gain sufficient to reach a self-oscillation threshold, said laser device including optically transparent means independent of said multi-path optical means, a detector, said multi-path optical means further directing said laser beams through said optically transparent means onto a target and onto said detector, said multi-path optical means further directing onto said detector the return laser beam from said target received by way of said optically transparent means along said plurality of paths to effect substantial amplification of said return beam, said detector producing a beat frequency signal equal to the doppler frequency shift resulting from motion of said target.

2. A moving target indicator system according to claim 1 wherein the portion of the reflector means disposed at one end of said lasing medium is adjustable to vary the number of paths of said laser beam through said lasing medium.

3. A moving target indicator system according to claim 2 wherein said adjustable portion of the reflector means comprises two semiconductor mirrors which are independently adjustable about two orthogonal axes.

4. A moving target indicator system according to claim 1 wherein said optically transparent means includes a pair of output windows through which said laser beam passes and disposed outside the region occupied by said reflector means.

5. A moving target indicator system according to claim 2 wherein said optically transparent means includes a pair of output windows through which said laser beam passes and disposed outside the region occupied by said reflector means.

* * * * *